United States Patent [19]

Ratzlaff et al.

[11] Patent Number: 4,819,418
[45] Date of Patent: Apr. 11, 1989

[54] SIMPLIFIED CROP BALER

[75] Inventors: Howard J. Ratzlaff, Hesston; Ferol S. Fell, Newton, both of Kans.

[73] Assignee: Hesston Corporation, Hesston, Kans.

[21] Appl. No.: 102,040

[22] Filed: Sep. 29, 1987

[51] Int. Cl.$^4$ ............................................. A01D 39/00
[52] U.S. Cl. ........................................ 56/341; 100/189
[58] Field of Search .................... 56/341; 100/142, 189

[56] References Cited

U.S. PATENT DOCUMENTS

| | | | |
|---|---|---|---|
| 2,720,073 | 10/1955 | Freeman, Jr. et al. | 56/341 |
| 2,775,339 | 12/1956 | Cadier | 56/341 |
| 2,909,887 | 10/1959 | Claas | 56/341 |
| 2,917,993 | 12/1959 | Nikkel | 100/189 |
| 2,929,191 | 3/1960 | Lohnert | 100/189 |
| 2,970,423 | 2/1961 | Wenzel | 56/341 |
| 3,990,359 | 11/1976 | Peis | 100/189 |
| 4,372,104 | 2/1983 | Simons et al. | 100/189 |
| 4,569,282 | 2/1986 | Galant | 100/189 |
| 4,644,862 | 2/1987 | Young | 100/189 |

*Primary Examiner*—Paul J. Hirsch
*Attorney, Agent, or Firm*—Hovey, Williams, Timmons & Collins

[57] ABSTRACT

An inexpensive square baler is provided with an arcuate baling chamber and a plurality of spaced apart plunger elements shiftable about a kidney-shaped, closed loop path of travel. The baling chamber is partially defined by a horizontal table and a wrapper which have a number of common openings each corresponding to one of the elements. During a return stroke portion of the plunger elements, the latter retract out of the baling chamber and re-enter the chamber between the openings in the table to enable the chamber to accumulate significant quantities of crop materials without interference with the plunger elements during their return stroke portion thereof. A header of the baler includes an auger mechanism having members which urge the crop materials directly through an inlet of the baling chamber without the need for intermediate conveying apparatus, and the members interleave with the plunger elements during the time that the latter pick up crop materials from the table in order to substantially close the inlet of the baling chamber and reduce the amount of crop materials that would otherwise be discharged in a reverse direction through the same.

17 Claims, 2 Drawing Sheets

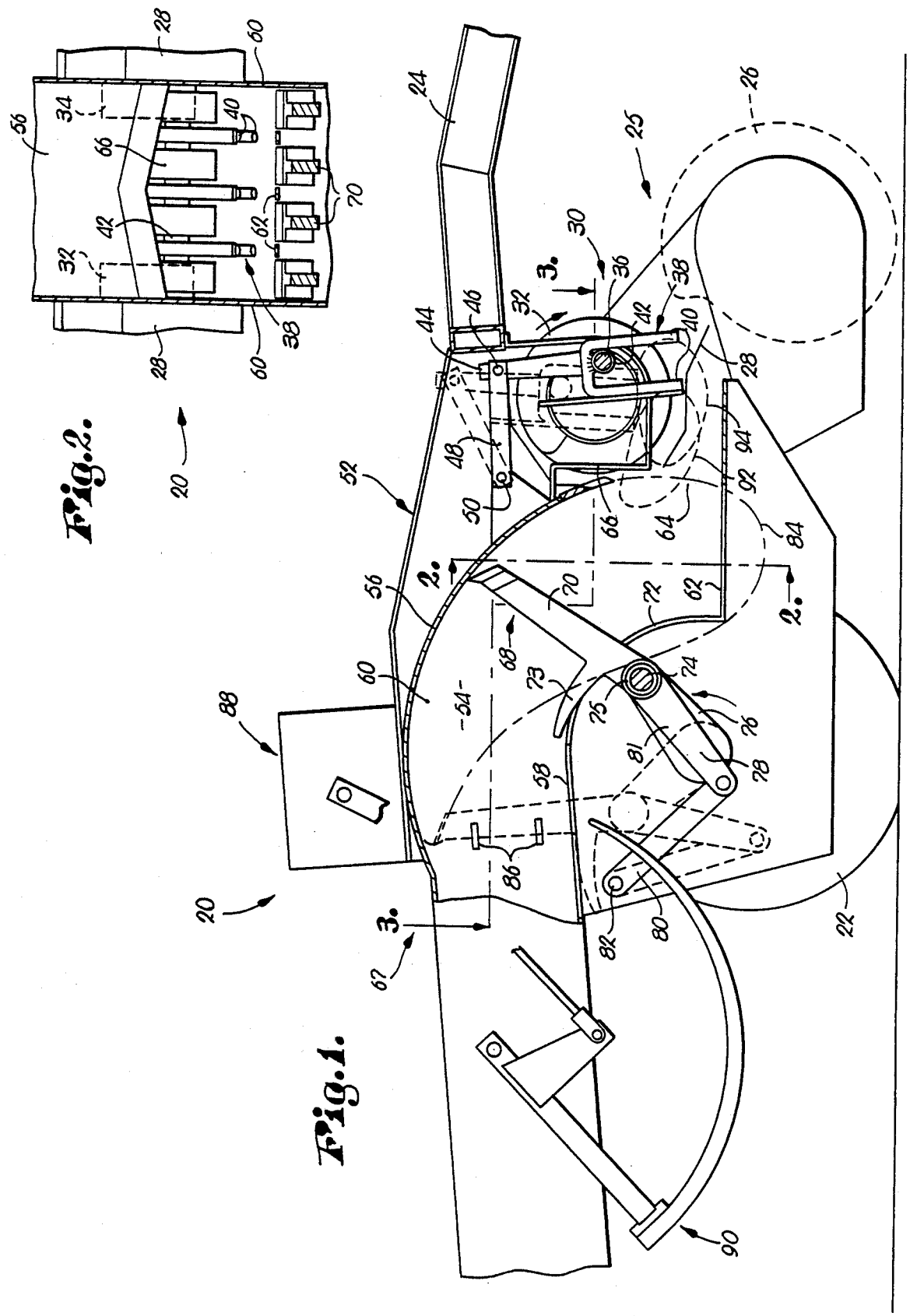

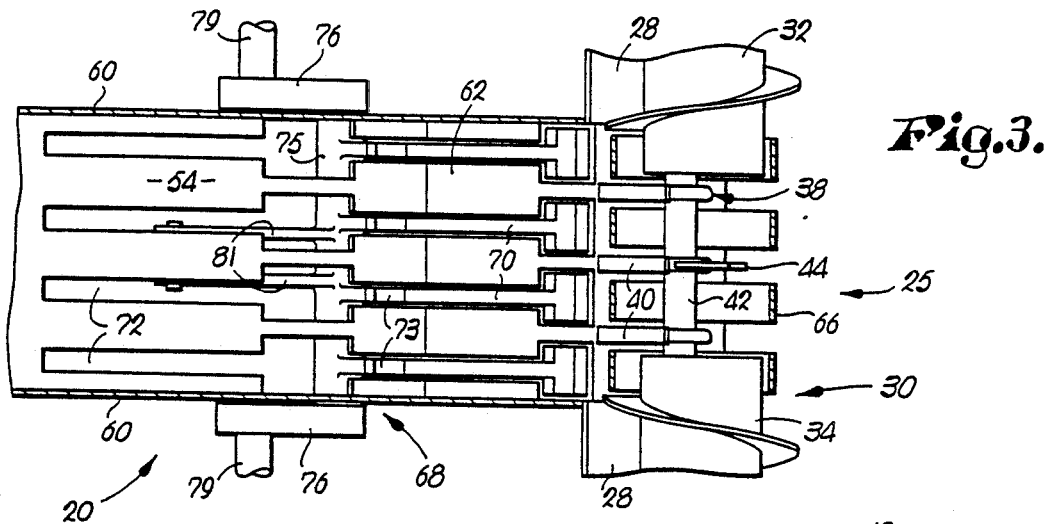
Fig.3.
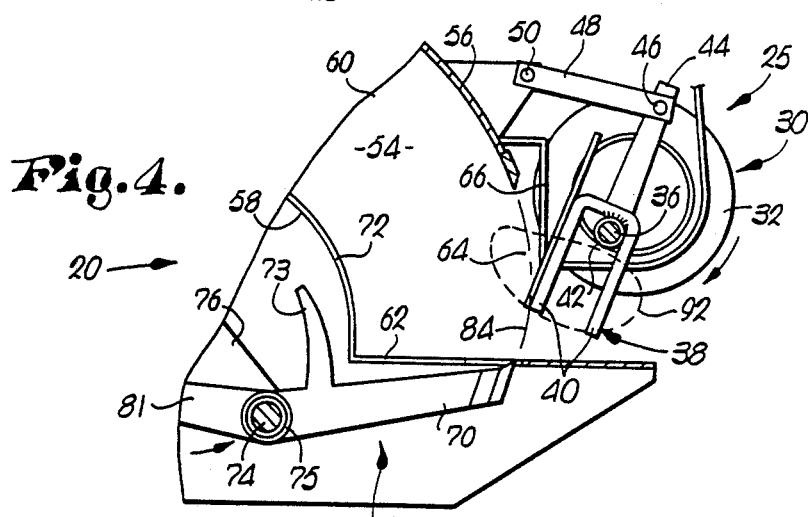
Fig.4.
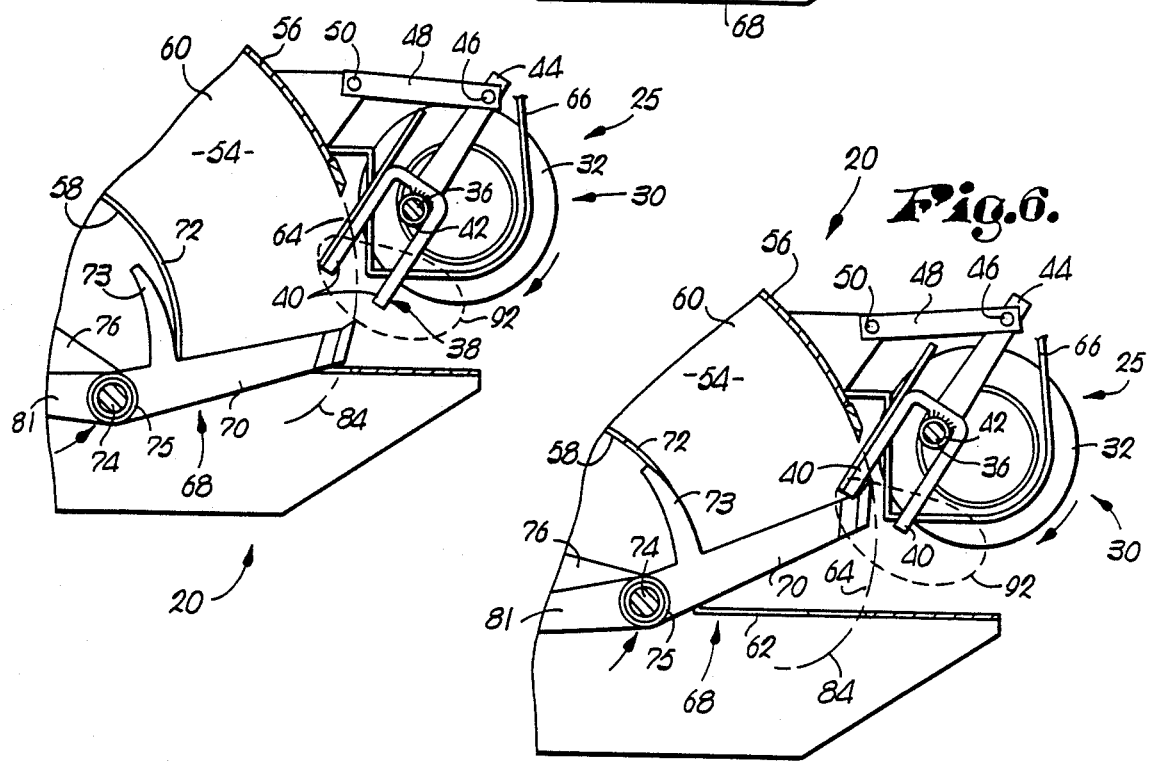
Fig.5.
Fig.6.

SIMPLIFIED CROP BALER

BACKGROUND OF THE INVENTION

1. Field of the Invention

The present invention concerns an economical square baler having a header with a crop pick-up and augering mechanism that discharges crop materials directly into the inlet of a baling chamber without the need for intermediate conveying and storage apparatus. The invention is also directed toward a baler having plunger elements movable along a return stroke path which is external of the baling chamber in order to avoid interference with accumulated crop materials therein.

2. Description of the Prior Art

Balers for producing square bales of hay conventionally include a header, a conveying apparatus and a bale forming section including a baling chamber and a plunger reciprocable within the chamber. The header includes a tine pick-up reel or the like for lifting crop materials from a windrow and discharging the lifted materials in the path of a crop consolidating device such as an auger extending in transverse relationship to the normal direction of advancement of the baler over the ground. The auger rotates to urge the crop materials laterally toward a conveying mechanism separate from the auger, and the conveying mechanism directs the materials first along a path through a chamber upstream of the baling chamber, and then through an inlet of the baling chamber in front of the path of travel of the plunger.

In many square balers, the plunger reciprocates in a linear motion, moving in a straight line toward the rear of the baler during the compaction and bale forming stroke and along a straight line in the opposite direction during a retraction stroke away from the partially formed bale. The conveying apparatus functions in timed relationship to the reciprocation of the plunger so that crop materials are introduced into the baling chamber between the plunger and the chamber outlet during the time that the plunger is in a retracted position spaced from the partially formed bale. As such, the chamber surrounding the conveying apparatus functions as an accumulator to receive crop materials steadily discharged from the auger and temporarily store the same before being swept into the baling chamber during the specific time period that the plunger is in its retracted position.

While many balers known in the art are capable of producing a satisfactory bale of hay, there has been a continuing need for an inexpensive baler within the reach of individuals associated with smaller farming operations. In this regard, it is to be noted that the conveying apparatus often found in conventional baling apparatus between the header and the bale forming structure represents a significant portion of the overall expense of the machine. In conveyors of certain balers, a relatively expensive cam and cam track arrangement is provided for shifting fingers of the conveyor along an irregular path in timed relationship to reciprocation of the plunger. Moreover, the conveyor drive mechanism and structure defining the chamber surrounding the conveyor tend to significantly increase the overall weight of the machine.

SUMMARY OF THE INVENTION

In accordance with our present invention, a simplified, inexpensive square baler is provided with a header having a crop pick-up and consolidating mechanism that discharges crop materials directly through an inlet of a baling chamber or pick-up, transport and compaction by spaced elements of a plunger assembly. An auger of the header carries a number of fingers which move through a closed loop path of travel during rotation of the auger to urge the consolidated materials in a lateral direction and toward a horizontally extending table within the baling chamber adjacent the chamber inlet. Preferably, the auger mechanism takes the form of two spaced auger sections having oppositely oriented flighting for directing crop materials toward the center of the baler and toward the fingers located between the augers. The fingers urge the crop materials directly into the baling chamber and eliminate the need for a conventional, intermediate conveying and storage device.

The baling chamber extends upwardly from the table in a curved direction and terminates in a bale forming section that lies along a generally horizontal axis. The fingers connected to the auger move through their closed loop path of travel in a time period shorter than the period of time between sequential compaction strokes of the plunger, so that the curved baling chamber functions to accumulate a portion of the crop materials before being lifted by the plunger and carried toward the bale forming section of the chamber. In this manner, a quantity of the crop materials resting on the table within the chamber can be temporarily stored while the plunger completes its compaction and bale forming stroke, a feature that is especially desirable when the flow rate of crop materials picked up by the header from the windrow is relatively heavy.

In other aspects of the invention, the wrapper and table of the baling chamber are provided with spaced apart openings which are each complemental in configuration to the shape of a respective one of the spaced plunger elements. The plunger elements are mounted for movement through a somewhat kidney-shaped, closed loop path of travel which includes a return stroke portion in which the elements move in a downwardly direction and retract out of the chamber. After the end of the return stroke portion, the elements change direction and move upwardly through openings in the table in order to lift crop materials deposited thereon and carry the same upwardly toward the bale forming section. As a consequence, the plunger elements avoid interference with crop materials previously deposited and temporarily stored on top of the table so that crop materials can be continually swept into and accumulate within the baling chamber during the time that the plunger elements move along a compaction stroke and a return stroke.

In preferred embodiments of the invention, the spaced fingers of the auger mechanism move through respective spaces between adjacent plunger elements in interleaved relationship to the same while the plunger elements move along their pick-up stroke portion of their path of travel immediately subsequent to the time that the plunger elements reenter the chamber through openings in the table. The configuration of the plunger elements is complemental to the shape of the fingers and structure defining the inlet of the baling chamber in order to temporarily close the inlet and substantially prevent discharge of crop materials in a reverse direction through the same. The fingers move in a cooperative, timed relationship to the plunger elements so that both the fingers and the elements move simultaneously along an upwardly directed portion of their respective closed loop paths of travel to facilitate carrying of the materials by the plunger elements toward the bale forming section of the chamber.

In other forms of the invention, the plunger elements are elongated and each are integrally connected to a corresponding, elongated arm disposed in transverse relationship to the respective element. The arms function to close a portion of the openings in the wrapper during the pick-up and compaction stroke of the plunger elements to substantially prevent crop materials from falling through those portions of the wrapper openings. In addition, the centrifugal force presented by movement of the plunger elements along a curved path following the arcuate central axis of the baling chamber tends to urge the lifted crop materials away from the wrapper openings in order to further promote retention of the loose materials within the chamber.

BRIEF DESCRIPTION OF THE DRAWINGS

FIG. 1 is a fragmentary, side cross-sectional view of a simplified crop baler constructed in accordance with the principles of the present invention, illustrating among other things a header and bale forming plunger and chamber of the baler;

FIG. 2 is a fragmentary, end cross-sectional view taken substantially along line 2—2 of FIG. 1 but with elements of the plunger assembly in a different position, and also depicting spaced fingers of an auger mechanism of the header;

FIG. 3 is a fragmentary, horizontal sectional view taken essentially along line 3—3 of FIG. 1 but with the plunger elements and auger mechanism fingers disposed in an orientation similar to their orientation shown in FIG. 4; and FIGS. 4–6 are fragmentary, side cross-sectional views of one of the plunger elements and a pair of the auger mechanism fingers, illustrating the path of travel of the fingers to convey crop materials directly through an inlet of the baling chamber and showing the cooperation of the fingers with the plunger element during a portion of a pick-up stroke of the latter.

DETAILED DESCRIPTION OF THE DRAWINGS

Referring initially to FIG. 1, a baler is broadly designated by the numeral 20 and has a pair of ground wheels 22 (only one shown) for advancement of the baler 20 over the ground in a direction determined by a towing vehicle (not shown) connected to a forwardly extending tongue 24 of baler 20. A front portion of baler 20 carries a header 25 having a tine reel pick-up unit 26 that is operable to lift crop materials from a windrow lying on the ground and deposit the same on floors 28 below an auger mechanism 30 of header 25.

The auger mechanism 30 is comprised of two spaced apart auger sections 32, 34 which can be seen by viewing FIG. 3. Flighting of auger section 32 is oriented in a direction opposite to the flighting of auger section 34, and the sections 32, 34 are mounted for common rotation in a direction for conveying crop materials toward the space between sections 32, 34. Each floor 28 extends substantially the full length of the corresponding overlying auger section 32, 34. As shown in FIG. 1 as well as FIGS. 4–6, a cylindrical shaft 36 is fixed on opposite ends to adjacent ends of the auger sections 32, 34 for mechanically joining the latter and enabling the sections 32, 34 to rotate together in the direction of the arrow depicted in the drawings.

As shown in FIGS. 2 and 3, three spaced crop engaging and conveying members 38 are disposed between the auger sections 32, 34. As illustrated in FIG. 1, each of the members 38 has an inverted U-shaped configuration to present two depending fingers 40 spaced apart from each other in a direction along the fore-and-aft axis of baler 20. The rearmost finger 40 of each member 38 includes an upstanding section of flat bar stock that is fixed to a cylindrical rod bent to present the remaining, forwardmost finger 40.

Each of the members 38 is secured to a cylindrical sleeve 42 that surrounds shaft 36 and which is freely rotatable relative to the latter. An upstanding leg 44 (FIGS. 1 and 3–6) is fixedly joined to the top of the central member 38 and is connected by means of a pivot 46 to a control arm 48. An end of the control arm 48 remote from pivot 46 is rotatably connected to a stationary pivot 50 that is fixed relative to a housing 52 of baler 20.

Referring now to FIG. 1, an elongated baling chamber 54 is defined by structure that includes a curved upper wall 56, a curved lower wall or wrapper 58, and two flat, vertical, spaced side walls 60 (FIGS. 2 and 3) interconnecting wall 56 and wrapper 58. In addition, a table 62 is disposed at a lower end of the baling chamber 54 and extends in a horizontal direction out of the latter toward a location just forwardly of the rotational, longitudinal axis of auger sections 32, 34. A lower end region of the upper wall 56 includes an elongated, inverted V-shaped blade (FIG. 2) which cooperates with the table 62 therebeneath to define an inlet 64 for the baling chamber 54. A wrapper 66 is connected to upper wall 56 externally of the baling chamber and extends to a location of housing 52 adjacent tongue 24. As shown best in FIGS. 2 and 3, each of the members 38 extend through a respective one of three elongated, spaced slots that are formed in wrapper 66.

The baling chamber terminates in an outlet 67 that includes a bale forming section which extends in a generally horizontal direction toward the rear of baler 20. The bale forming section of baling chamber 54 is rectangular and has a laterally shiftable top wall for presenting a restricted orifice in order to extrude bales of crop materials from the baling chamber 54.

A plunger assembly 68 has four spaced apart, elongated elements 70 that each carry an enlarged head having a knife. Each of the elements 70 extends through a respective one of four elongated openings 72 that are formed in the wrapper 58 and which can be perhaps best appreciated by reference to FIG. 3. An end region of each element 70 remote from the head, as shown in FIG. 1, is fixed to a sleeve 73 for pivotal movement about an internal shaft 74 that is, in turn, fixed to ends of drive cranks 76 which are secured to drive shafts 79 (FIG. 3) for rotation about a pivot point designated 78 (FIG. 1). One end of a control arm 80 is pivotally coupled to an end of two links 81 fixed to sleeve 75 (see also FIG. 3), and an opposite end of the control arm 80 is connected to a pivot 82 (FIG. 1) that is stationary relative to housing 52.

Crank 78, drive shaft 79, control arm 80 and link 81 represent a drive mechanism for simultaneously shifting the elements 70 of plunger 68 through a generally kidney-shaped, closed loop path of travel designated by the dashed line 84 in FIG. 1. The path of travel 84 includes a pick-up stroke portion that extends in an upward direction, a compaction stroke portion near the top of baling chamber 54, and a return stroke portion wherein the elements 70 retract through openings 72 for return to a position below table 62, as will be described in further detail hereinbelow.

Finally, the baler 20 has a pair of otherwise conventional hay dogs 86 shiftably mounted on each of the side walls 60. A knotter 88 includes a needle mechanism 90 for tying the binding line, such as baling twine, wire or the like around completed bales of hay in a manner well known to those skilled in the art.

OPERATION

As baling chamber is advanced across the ground, pick-up unit 26 of header 25 lifts crop materials from a windrow and deposits the same along the length of auger floors 28. The auger sections 32, 24 simultaneously rotate in the direction of the arrow in FIGS. 1 and 4–6 to draw crop materials deposited on the floors 28 toward the space between adjacent ends of the auger sections 32, 34. The crop materials drop from the floor 28 corresponding to each auger section 32, 34 upon reaching the space between adjacent sections 32, 34.

As the auger sections 32, 34 rotate, fingers 40 of the three spaced apart members 38 move along respective, kidney-shaped closed loop paths of travel 92, 94 as illustrated in FIG. 1. The fingers 40 urge crop materials drawn by sections 32, 34 toward the center of auger mechanism 30 in a direction laterally of the rotational axes of sections 32, 34, toward the rear of baler 20 and directly through inlet 64. As shown in FIGS. 4–6, a portion of the rearwardmost finger 40 of each member 38 moves through the inlet 64 and into the baling chamber 54 during a part of its closed loop path of travel 92.

The four spaced elements 70 of the plunger assembly 68 shift along their closed loop path of travel 84 simultaneous with movement of the fingers 40 along paths of travel 92, 94. A crop engaging face of each plunger element 70 is maintained in generally perpendicular relationship to the curved central axis of the baling chamber 54 during the pick-up stroke portion and the compaction stroke portion of the path of travel 84. Thus, when the elements 70 reach the top of the baling chamber, the crop engaging face of each element 70 is at an angle for proper compaction and formation of a bale against the resistance presented by a downstream bale extruded through the restricted orifice presented at the baling chamber outlet 67.

During a return stroke portion of the elements 70, the latter retract through the elongated openings 72 to a position completely outside of the chamber 54. The elements 70 then continue their downward motion as dictated by the control arm 80 until reaching a lower end of the path of travel 84, whereupon the elements 70 begin to move in an upwardly direction along a pick-up stroke portion of the path of travel 84. The elements 70, upon reaching table 62, pass through the complementally configured openings 72 in the same to thereby lift and carry accumulated crop materials previously directed into the baling chamber 54 through inlet 64 by auger mechanism fingers 40.

The configuration of the openings 72 of the wrapper 66 and table 62, as best shown in FIG. 3, includes enlarged rectangular apertures which are shaped for complemental reception of the enlarged heads of elements 70. The remaining regions of the openings 72, however, are narrower and of a width slightly larger than the thickness of the major extent of elements 70 and the thickness of an arm 73 integrally joined to each element 70 in generally transverse relation to the same.

Elements 70 cooperate with the rearwardmost finger 40 of members 38 to substantially close the inlet 60 during a period of time immediately subsequent to passage of the elements 70 upwardly through table 62. As shown in FIG. 4, the rear fingers 40 are initially above elements 70, and then shift further into the baling chamber 54 as the elements 70 continue to rise as shown in FIG. 5. As the elements 70 continue their upward travel, the elements 70 "meet" the rear fingers 40 as illustrated in FIG. 6 and move through corresponding spaces between adjacent pairs of the fingers 40 in interleaved relationship to the latter. As a consequence, rear fingers 40 cooperate with the elements 70 to substantially prevent undesirable discharge of crop materials through the inlet 64 and back toward the front of the baler 20 during the time that the plunger elements 70 are rising to convey materials toward the bale forming section of baling chamber 54.

Moreover, the transversely extending arms 73, being complemental in configuration to the openings 72 of wrapper 66, reduce the likelihood of crop materials dropping through the openings 72 during upward motion of plunger assembly 68. As shown in FIG. 6, the arms 73 during the pick-up stroke portion of movement of elements 70 close off lower regions of the openings 72. As the elements 70 move upwardly in an arc toward the full line position shown in FIG. 1, arms 73 continue to close off regions of the openings 72 immediately ahead of the elements 70.

Preferably, the fingers 40 move through their closed loop paths of travel 92, 94 during a period of time shorter than the time of travel of the elements 70 through path 84. In one example, good results were observed when the fingers 40 moved through three cycles of operation about paths 92, 94 during the time that the elements 70 completed one cycle of operation around path 84. In this manner, members 38 function to continually deposit and load crop materials into the baling chamber 54 and onto table 62, so that significant quantities of crop materials are available for transport and compaction by the plunger elements 70 during their compaction strokes thereof. Retraction of the plunger elements 70 through openings 72 in the wrapper 66 during the return stroke portion of the plunger elements 70 avoids interference of the accumulated crop materials with the elements 70 during their return stroke portion of the path of travel 84.

Pivotal motion of the plunger elements 70 about an axis disposed below the curved baling chamber 54 is advantageous in that centrifugal force exerted on the crop materials by the plunger elements 70 tends to urge the same upwardly away from the openings 72 in wrapper 66. Thus, once the plunger elements 70 have reached the end of their compaction stroke as indicated by the dashed lines in FIG. 1, the materials are substantially evenly distributed vertically along the upstream face of the partially formed bale so that the completed bale, once tied, is of a satisfactory rectangular shape.

We claim:
1. A baler comprising:
structure defining a baling chamber having an inlet and an outlet;
means for introducing crop materials through said inlet and into said chamber;
a plunger assembly having a plurality of spaced apart elements each presenting a crop engaging face for receiving crop materials introduced into said chamber and compacting the crop materials into the form of a bale;

restricted orifice means located at said outlet of said baling chamber for extruding a bale of crop materials from said baling chamber during the time that said crop engaging faces of said plunger elements are compacting the crop materials of an upstream bale against the resistance presented by an extruded bale; and means for shifting said elements of said plunger assembly through a closed loop path of travel including a compaction stroke portion for compacting the crop materials into a bale and a return stroke portion for receiving additional crop materials, said structure defining said baling chamber including means defining a number of openings each corresponding to one of said plurality of plunger elements, said means for shifting said elements including means for retracting at least a substantial portion of said elements through the respective openings and out of said baling chamber during a part of said return stroke portion of said closed loop path of travel for enabling said elements to return to a position behind crop materials introduced into said chamber.

2. The invention as set forth in claim 1, wherein said elements have a configuration complemental to the configuration of said openings for substantially closing the latter in regions adjacent said chamber inlet during the approximate time period that said plunger elements receive said crop materials introduced through said inlet, in order to substantially prevent outflow of crop materials through said openings.

3. The invention as set forth in claim 2, wherein said structure defining said baling chamber includes table means extending in a generally horizontal direction adjacent said inlet for supporting crop materials introduced through said inlet, and wherein said baling chamber extends in an arcuate direction upwardly from said table means.

4. The invention as set forth in claim 3, wherein said openings extend into said table means, wherein said plunger elements each have an elongated axis, and wherein said plunger assembly includes a plurality of elongated arms each connected to one of said plunger elements in generally transverse relationship to the latter for closing the remaining portions of said openings when said elements are disposed adjacent said portions of said openings extending into said table means.

5. The invention as set forth in claim 1, wherein said elements each include an enlarged head carrying knife means.

6. The invention as set forth in claim 1, wherein said means for introducing crop materials through said inlet and into said chamber includes at least one finger movable through a closed loop path of travel.

7. The invention as set forth in claim 6, wherein said closed loop path of travel of said at least one finger includes a path through the space between adjacent elements in interleaved relationship to the latter.

8. A baler comprising:
structure defining a baling chamber having an inlet and an outlet;
means defining a generally horizontally extending table disposed adjacent said inlet and internally of said chamber, means for introducing crop materials through said inlet and onto said table including a plurality of spaced apart fingers and drive means for moving said fingers through a closed loop path of travel into and out of said chamber;

a plunger assembly having a plurality of spaced apart elements each presenting a crop engaging face for receiving crop materials introduced through said inlet and compacting the crop materials into the form of a bale; and means for shifting said plunger elements along a path of travel including a compaction stroke portion for compacting the crop materials into the bale and an upwardly extending pickup stroke portion for receiving crop materials introduced through said inlet, said shifting means including means for moving each of said elements along respective paths through a corresponding space between adjacent pairs of said fingers in interleaved relationship to the latter during said pickup stroke portion in order to substantially close said inlet and generally preclude escape of materials through the same.

9. The invention as set forth in claim 8, wherein said drive means moves said fingers through their closed loop path of travel in a time less than the time period between sequential return stroke portions of said elements.

10. A baler comprising:
structure defining a baling chamber having an inlet and an outlet;
means defining a generally horizontally extending table adjacent said inlet and internally of said chamber,
means for introducing crop materials through said inlet and onto said table;
a plunger assembly having a plurality of spaced apart elements each presenting a crop engaging face for receiving crop materials introduced through said inlet and compacting the crop materials for formation of a bale; and
means for shifting said plunger elements along a closed loop path of travel including a compaction stroke portion for compacting the crop materials into the bale, a return stroke portion and an upwardly extending pickup stroke portion,
said structure defining said baling chamber and said means defining said table presenting a plurality of openings each corresponding to one of said plunger elements,
said means for shifting said plunger elements including means for retracting in a downwardly direction at least a substantial portion of said elements through the respective openings and out of said baling chamber during a part of said return stroke portion,
said means for shifting said elements including means for re-introducing said elements into said chamber during said pickup stroke portion in an upwardly direction in order to lift and carry crop materials introduced through said inlet and resting on said table.

11. The invention as set forth in claim 10, wherein said baling chamber extends in a generally arcuate direction, and wherein said plunger elements move along an arcuate path complemental to the arcuate direction of extension of said baling chamber during said compaction stroke portion of said path of travel.

12. The invention as set forth in claim 11, wherein said baling chamber terminates at said outlet in a bale forming section which extends in a generally horizontal direction.

13. The invention as set forth in claim 10, wherein said plunger elements each have an elongated axis, and wherein said plunger assembly includes a plurality of elongated arms each connected to one of said plunger elements in a generally transverse relationship to the latter.

14. A baler comprising:

a header including pickup apparatus for lifting crop materials from a windrow and consolidating means including a rotatable, elongated auger mounted in disposition to receive crop materials from said pickup apparatus, said header further including at least one member at least partially carried by said auger for movement therewith about a closed loop path of travel during rotation of said auger for directing crop materials conveyed by said auger in a direction generally transverse to the longitudinal axis of the latter; and means for producing a bale including structure defining a baling chamber and a plunger assembly movable within said chamber, said structure defining said chamber including means defining an inlet and a restricted orifice outlet for extruding a bale of crop materials from said baling chamber during the time that said plunger assembly is compacting crop materials of an upstream bale against the resistance presented by an extruded bale, said inlet being disposed directly adjacent said closed loop path of travel of said at least one member for enabling crop materials directed by said member to pass through said inlet and into said chamber without the need for additional crop conveying apparatus.

15. The invention as set forth in claim 14, wherein said plunger assembly comprises a plurality of spaced apart elements each presenting a crop engaging face; and means for shifting said elements of said plunger assembly through a closed loop path of travel including a compaction stroke portion for compacting the crop materials into a bale and a return stroke portion for receiving additional crop materials, said structure defining said baling chamber including means defining a number of openings each corresponding to one of said plurality of plunger elements, said means for shifting said elements including means for retracting at least a substantial portion of said elements through the respective openings and out of said baling chamber during a part of said return stroke portion of said closed loop path of travel for enabling said elements to return to a position behind crop materials introduced into said chamber.

16. The invention as set forth in claim 14, wherein said bale producing means includes means defining a generally horizontal table located adjacent said inlet for receiving crop materials directed by said member.

17. The invention as set forth in claim 16, wherein said plunger assembly comprises a plurality of spaced apart elements and a drive mechanism for moving said elements through a closed loop path of travel, and wherein said closed loop path of travel of said at least one member of said header includes a portion passing through the space between adjacent pairs of said plunger elements in order to substantially close said inlet and substantially prevent escape of crop materials in a reverse direction through the latter.

* * * * *